United States Patent
Tonkovich et al.

(10) Patent No.: US 7,641,865 B2
(45) Date of Patent: Jan. 5, 2010

(54) FLOW CONTROL THROUGH PLURAL, PARALLEL CONNECTING CHANNELS TO/FROM A MANIFOLD

(75) Inventors: Anna Lee Tonkovich, Dublin, OH (US); Bin Yang, Columbus, OH (US); Steven T. Perry, Galloway, OH (US); Sean P. Fitzgerald, Columbus, OH (US); Ravi Arora, New Albany, OH (US); Robert Luzenski, Marysville, OH (US); Thomas D. Yuschak, Lewis Center, OH (US)

(73) Assignee: Velocys, Plain City, OH (US)

( * ) Notice: Subject to any disclaimer, the term of this patent is extended or adjusted under 35 U.S.C. 154(b) by 445 days.

(21) Appl. No.: 11/400,056

(22) Filed: Apr. 7, 2006

(65) Prior Publication Data

US 2006/0275185 A1 Dec. 7, 2006

Related U.S. Application Data

(60) Provisional application No. 60/669,640, filed on Apr. 8, 2005.

(51) Int. Cl.
  *B01J 10/00* (2006.01)
(52) U.S. Cl. .................. 422/129; 422/188; 422/189
(58) Field of Classification Search .......... 422/129, 422/188, 189; 366/336, 338, 340
See application file for complete search history.

(56) References Cited

U.S. PATENT DOCUMENTS

| | | | |
|---|---|---|---|
| 3,847,211 A | 11/1974 | Fishel et al. | |
| 4,343,354 A | 8/1982 | Weber | |
| 5,000,253 A | 3/1991 | Komarnicki | |
| 5,388,635 A * | 2/1995 | Gruber et al. | 165/80.4 |
| 5,482,680 A | 1/1996 | Wilkinson et al. | |
| 5,595,712 A * | 1/1997 | Harbster et al. | 422/129 |
| 5,915,469 A * | 6/1999 | Abramzon et al. | 165/134.1 |
| 6,101,715 A * | 8/2000 | Fuesser et al. | 29/890.03 |
| 6,537,506 B1 | 3/2003 | Schwalbe et al. | |
| 6,637,463 B1 | 10/2003 | Lei et al. | |
| 7,361,314 B1 * | 4/2008 | Stahler et al. | 422/102 |
| 2002/0106311 A1 | 8/2002 | Golbig et al. | |
| 2002/0125001 A1 | 9/2002 | Kelly et al. | |
| 2002/0187090 A1 | 12/2002 | Vanden Bussche et al. | |
| 2003/0027354 A1 | 2/2003 | Geli | |
| 2003/0043544 A1 | 3/2003 | Nelson et al. | |

(Continued)

FOREIGN PATENT DOCUMENTS

DE  2428964 A1  1/1976

(Continued)

OTHER PUBLICATIONS

PCT Search Report mailed Aug. 22, 2006 including Written Opinion of the International Searching Authority.

(Continued)

*Primary Examiner*—Walter D Griffin
*Assistant Examiner*—Huy-Tram Nguyen
(74) *Attorney, Agent, or Firm*—Frank Rosenberg

(57) ABSTRACT

The invention provides apparatuses and techniques for controlling flow between a manifold and two or more connecting microchannels. Flow between plural connecting microchannels, that share a common manifold, can be made more uniform by the use of flow straighteners and distributors that equalize flow in connecting channels. Alternatively, flow can be made more uniform by sections of narrowed diameter within the channels. Methods of making apparatus and methods of conducting unit operations in connecting channels are also described.

21 Claims, 11 Drawing Sheets

U.S. PATENT DOCUMENTS

| | | | |
|---|---|---|---|
| 2003/0062149 | A1 | 4/2003 | Goodson et al. |
| 2003/0118486 | A1 | 6/2003 | Zhou et al. |
| 2003/0173650 | A1 | 9/2003 | Larsson et al. |
| 2004/0104010 | A1 | 6/2004 | Kenny et al. |
| 2005/0087767 | A1* | 4/2005 | Fitzgerald et al. ............ 257/200 |

FOREIGN PATENT DOCUMENTS

| | | | |
|---|---|---|---|
| DE | 19935433 | A1 | 1/1999 |
| DE | 10148926 | A1 | 4/2003 |
| EP | 1038575 | | 9/2000 |
| WO | WO 01/08799 | * | 2/2001 |
| WO | WO 02/072252 | | 9/2002 |
| WO | WO 03/043730 | | 5/2003 |
| WO | WO 03/080233 | | 10/2003 |
| WO | WO 03/097229 | | 11/2003 |
| WO | WO 2004/042303 | | 5/2004 |
| WO | WO 2005/044442 | | 5/2005 |
| WO | WO 2005/105294 | | 11/2005 |
| WO | WO 2005/105665 | | 11/2005 |
| WO | WO 2006/065387 | | 6/2006 |
| WO | WO2006/107206 | | 10/2006 |

OTHER PUBLICATIONS

Amador et al., "Flow Distribution in different microreactor scale-out geometries and the effect of manufacturing tolerances and channel blockage," Chem. Eng. Journal, 101, pp. 379-390, 2004.

PCT International Preliminary Report on Patentability from PCT/US2004/035601.

PCT Search Report from PCT/US2004/035601 mailed Apr 12, 2005 including Written Opinion of the International Searching Authority.

Zhao et al., "Microchannel Heat Exchangers with Carbon Dioxide," pp. 1-103 (2001).

Mas et al., "Scalable Microfabricated Multiphase reactors for Direct Fluorination Reactions," Transducers '03, 655-658 (2003).

Commenge et al., "Optimal Decisgn for Flow Uniformity in Microchannel Reactors," AIChE Journal, 345-358 (Feb. 2002).

Rebrov et al., "Header Design for Flow Equalization in Microstructured Reactors," AIChE Journal, 28-38 (2007).

Griffini et al., "Effect of Microchannel Plate Design on Fluid Flow Uniformity at Low Flow Rates," Chem. Eng. Technol. 395-406 (2007).

Bergles et al., "On the Nature of Critical Heat Flux in microchannels," J. Heat Transfer, 101-107 (Jan. 2005).

Balaji et al., "Improved Design of Microchannel Plate Geometry for uniform Flow Distribution," Can. J. Of Chem. Eng., 715-721 (Dec. 2006).

Delsman et al., "Microchannel Plate Geometry Optimization for Even Flow Distribution at High Flow Rates," Trans. IChemE Part A, 267-275 (Feb. 2004).

Jousse et al., "Compact model for multiphase liquid-liquid flows in microfluidic devices," Lab on a Chip, 646-656 (2005).

* cited by examiner

Bifurcated channel

FLOW CONTROL THROUGH PLURAL, PARALLEL CONNECTING CHANNELS TO/FROM A MANIFOLD

RELATED APPLICATIONS

In accordance with 35 U.S.C. sect. 119(e), this application claims priority to U.S. Provisional Application No. 60/669,640 filed 8 Apr. 2005.

FIELD OF THE INVENTION

This invention relates to flow through manifolds and connecting channels.

INTRODUCTION

There has been significant interest in controlling flow in plural, parallel channels that connect to a manifold. Specifically, there has been a problem with nonuniform flow in the connecting channels leading to device inefficiencies. Detailed solutions to this problem can be found in U.S. Published Patent Application No. 2005/0087767 by Fitzgerald et al., which is incorporated herein as if reproduced in full below.

A less effective design has been described by Golbig et al., in U.S. Patent Application Publication 2002/0106311 which described plate microreactor designs in which the widths of connecting channels are varied in order to provide equalized residence time of fluids in the channels. Calculations based on this design show that this design is inadequate for obtaining highly equal flow from a header through all connecting channels.

The present invention provides new designs and methods with improved flow uniformity under some operating conditions.

SUMMARY OF THE INVENTION

In a first aspect, the invention provides a chemical processing device comprising: a manifold comprising an opening; at least two parallel connecting channels, a first connecting channel and a second connecting channel connected to the manifold; and a flow control structure. In one flow control structure, in each of the at least two parallel connecting channels, 20% or more of the channel's length is characterized by a constant cross-sectional area, and 80% or less of the channel's length is characterized by a cross-sectional area reduced in size (relative to the 20% or more of the channel's length that is characterized by a constant cross-sectional area). The first connecting channel has a longer length of constant cross-sectional area than does the second connecting channel. Preferably, the manifold is a header. The area reduced in size is significantly reduced in size so that flow is restricted; it is not simply a catalyst coating, etc. The reduced area may also contain a catalyst coating. In some embodiments, in each of the at least two parallel connecting channels, 50% (or 80%) or more of the channel's length is characterized by a constant cross-sectional area; in some embodiments up to 95% of the length has a constant cross-sectional area. In preferred embodiments, the header manifold comprises an inlet and the first connecting channel has a shorter length of reduced cross-sectional area than does the second connecting channel; and the first connecting channel is closer to the inlet than the second connecting channel. Flow passing though the inlet passes into the manifold and momentum tends to force greater flow through the second connecting channel; however, the longer constricted flow path in the second channel creates greater resistance and tends to equalize flow through the connecting channels. In some preferred embodiments the manifold is an L-manifold. The manifold can be in the plane of the connecting channels or in a layer above or below the plane of the connecting channels.

In an alternative flow control structure, a flow straightener is connected to the manifold opening; and a flow distribution section connects the flow straightener and the parallel connecting channels. The flow straightener has a length to hydraulic diameter ($L_{fs}/D_h$) of at least 1 (preferably at least 5) and a cross sectional area and the flow distribution section comprises a cross sectional area that is greater than the cross sectional area of the flow straightener.

The edges between areas of a channel (preferably a microchannel) that are reduced in cross-sectional area can be sloped (such as by etching) or stepwise (such as by bonded, stamped shims). The areas of a channel that are reduced in cross-sectional area can be disposed at the beginning of channel (next to the header manifold), the end of channel, or in the middle of the channel. The areas of a channel that are reduced in cross-sectional area can be continuous or dispersed along a channel's length.

In another aspect, the invention provides a chemical processing device comprising: a manifold comprising an opening; at least two parallel connecting channels, a first connecting channel and a second connecting channel, connected to the manifold; and further characterized by a flow control structure that comprises: a flow straightener connected to the manifold opening; and a flow distribution section connecting the flow straightener and the parallel connecting channels. The flow distribution section comprises a cross sectional area that is greater than the cross sectional area of the flow straightener. Also, the device comprises a characteristic Q factor ($Q_1$) of 10% or less.

In a further aspect, the invention provides a chemical reactor comprising at least two parallel connecting channels, a first connecting channel and a second connecting channel, connected to a manifold. A portion of the first connecting channel and a portion of the second connecting channel contain catalyst; the catalyst-containing portion of the first connecting channel and the catalyst-containing portion of the second connecting channel have equal and constant cross-sectional areas. The first connecting channel has a first length of reduced cross-sectional area and the second connecting channel has a second length of reduced cross-sectional area; wherein the first length is less than the second length. In some preferred embodiments, the manifold is a header.

This invention includes apparatus and methods of making apparatus (preferably laminated apparatus). For example, analogous to the first aspect described above, the invention provides a method of making a laminated device comprising: stacking plural laminae into a stack of laminae; wherein at least one of the plural laminae comprises at least two parallel connecting channels, a first connecting channel and a second connecting channel; wherein, in each of the at least two parallel connecting channels, 20% or more of the channel's length is characterized by a constant cross-sectional area, and 80% or less of the channel's length is characterized by a cross-sectional area reduced in size (relative to the 20% or more of the channel's length is characterized by a constant cross-sectional area); and wherein the first connecting channel has a longer length of constant cross-sectional area than does the second connecting channel. The at least two parallel connecting channels are connected to a manifold.

In some preferred embodiments, the connecting channels are partially etched into a shim. Channels of the desired structure could also be molded, formed by a deposition process, or combinations of these. In some embodiments, channels are formed through the entire thickness of a layer. Similarly, the invention includes methods of making laminated chemical reactors in which catalyst is deposited in constant area portions.

In a further aspect, the invention provides a method of making a laminated device comprising: stacking plural laminae into a stack of laminae; wherein at least one of the plural laminae comprises at least two parallel connecting channels, a first connecting channel and a second connecting channel; wherein, in each of the at least two parallel connecting channels, 20% or more of the channel's length is characterized by a constant cross-sectional area, and 80% or less of the channel's length is characterized by a cross-sectional area reduced in size (relative to the 20% or more of the channel's length is characterized by a constant cross-sectional area); wherein the first connecting channel has a longer length of constant cross-sectional area than does the second connecting channel; and wherein the at least two parallel connecting channels are connected to a manifold.

In another aspect, the invention provides a method of conducting a unit operation in a microchannel device, comprising: passing a fluid into a manifold inlet of a microchannel device, comprising: a manifold comprising the inlet and at least one opening; and a flow straightener connected to the at least one opening. Flow through the flow straightener can laminar flow in which case the hydrodynamic dimensionless length of the flow straightener is 0.005 or greater, where hydrodynamic dimensionless length is:

$$x^+ = \frac{L_{st}}{Re_{st}D_{st}}, \text{ where}$$

$L_{st}$=Length of the flow straightener; $Re_{st}$=Reynolds number of fluid in the flow straightener; and $D_{st}$=Hydraulic diameter of the flow straightener. Alternatively, flow through the flow straightener can be anything other than laminar flow and, in which case, the flow straightener has a length to hydraulic diameter ($L_{fs}/D_h$) of at least 1 (preferably at least 5). A flow distribution section connects the flow straightener and the parallel connecting channels. At least a portion of the fluid passes from the manifold, through the flow straightener, into the flow distribution section, and then into the connecting channels. The fluid has a first velocity in the flow straightener and a second velocity in the flow distribution section, wherein the first velocity is greater than the second velocity; and a unit operation is conducted on the fluid in the connecting channels.

Q factor can be used as a metric to characterize apparatus containing connecting channels. Whether a given apparatus possesses a claimed characteristic (that is, a Q factor ($Q_1$) of 10% or less, more preferably 5% or less, or 2% or less, or in some embodiments, in the range of 0.5% to 5%). To determine the Q factor property of a device, air is flowed through the device at 20° C. and Mo=0.5. The distribution through connecting channels can be measured directly or from computational fluid dynamic (CFD) modeling as exemplified below.

The invention includes processes of conducting chemical reactions and other unit operations in the apparatus described herein. The invention also includes prebonded assemblies and laminated devices of the described structure and/or formed by the methods described herein. Laminated devices can be distinguished from nonlaminated devices by optical and electron microscopy or other known techniques. The invention also includes methods of conducting chemical processes in the devices described herein and the methods include the steps of flowing a fluid through a manifold and conducting a unit operation in the connecting channels (if the manifold is a header, a fluid passes through the manifold before passing into the connecting channels; if the manifold is a footer then fluid flows in after passing through the connecting channels). In some preferred embodiments, the invention includes nonreactive unit operations, including heat exchangers, mixers, chemical separators, solid formation processes within the connecting channels, phase change unit operations such as condensation and evaporation, and the like; such processes are generally termed chemical processes, which in its broadest meaning (in this application) includes heat exchange, but in preferred embodiments is not solely heat exchange but includes a unit operation other than heat exchange and/or mixing.

The invention includes processes of conducting chemical reactions in any of the designs or methods of the invention. Reactions of the present invention include: acetylation, addition reactions, alkylation, dealkylation, hydrodealkylation, reductive alkylation, amination, ammoxidation aromatization, arylation, autothermal reforming, carbonylation, decarbonylation, reductive carbonylation, carboxylation, reductive carboxylation, reductive coupling, condensation, cracking, hydrocracking, cyclization, cyclooligomerization, dehalogenation, dehydrogenation, oxydehydrogenation, dimerization, epoxidation, esterification, exchange, Fischer-Tropsch, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating (including hydrodesulferization HDS/HDN), isomerization, methylation, demethylation, metathesis, nitration, oxidation, partial oxidation, polymerization, reduction, reformation, reverse water gas shift, Sabatier, sulfonation, telomerization, transesterification, trimerization, and water gas shift. For each of the reactions listed above, there are catalysts and conditions known to those skilled in the art; and the present invention includes apparatus and methods utilizing these catalysts. For example, the invention includes methods of amination through an amination catalyst and apparatus containing an amination catalyst. The invention can be thusly described for each of the reactions listed above, either individually (e.g., hydrogenolysis), or in groups (e.g., hydrohalogenation, hydrometallation and hydrosilation with hydrohalogenation, hydrometallation and hydrosilation catalyst, respectively). Suitable process conditions for each reaction, utilizing apparatus of the present invention and catalysts that can be identified through knowledge of the prior art and/or routine experimentation. To cite one example, the invention provides a Fischer-Tropsch reaction using a device (specifically, a reactor) having one or more of the design features described herein.

Glossary

As is standard patent terminology, "comprising" means "including" and neither of these terms exclude the presence of additional or plural components. For example, where a device comprises a lamina, a sheet, etc., it should be understood that the inventive device may include multiple laminae, sheets, etc.

The "channel axis" is the line through the center of a channel's cross-section as it extends through the channel.

"Bonding" means attaching or adhering, and includes diffusion bonding, gluing, brazing and welding.

Capacity of a manifold, $C_{man}$, is defined as the mass processed per unit volume of manifold:

$$C_{man} = \frac{m_{man}}{V_{man}} \quad (1)$$

where $m_{man}$[kg/sec]=Mass flow rate for a manifold $V_{man}$[m$^3$]=The total volume of the manifold: the manifold channels; internal distribution features, such as sub-manifolds and gates, grates and other manifold connection channels, including their containment walls; the external containment walls of the manifold, including space between manifold channels not used for other manifolds or processing channels. The total volume of the manifold does not include the channel walls in the layers directly above or below the manifold channel. The external containment wall volume in an M2M manifold includes that volume that separates the manifold from the necessary device perimeter of a microchannel device, which occurs around the entire device. It includes the wall volume separating the channels of fractal distribution manifolds that aren't used by other connecting channels.

For microchannel devices with M2M manifolds within the stacked shim architecture, the M2M manifolds add to the overall volume of the device and so it is desirable to maximize the capacity of the manifold. In preferred embodiments of the invention, an M2M distributes at least 0.1 kg/m$^3$/s, preferably 1 kg/m$^3$/s or more, more preferably at least 10 kg/m$^3$/s, and in some preferred embodiments distributes 30 to 500 kg/m$^3$/s.

The connections between the manifold and the connecting channels (i.e., the M2M distribution structures) described herein preferably have thicknesses (i.e., heights) of 20 μm to 5 mm, more preferably 2 mm or less, and preferably have widths in the range of 100 μm to 5 cm and in some preferred embodiments have widths more than 250 micrometers and less than one millimeter. The lengths of the connecting channels have a lower limit of zero and an upper limit of 1 meter, and in some preferred embodiments a range of 2 millimeters to 10 cm.

The cross-sectional area of a channel is that cross-sectional plane normal to the channel axis. It excludes the cross-sectional area of the wall and any applied coatings (catalyst, bonding, metal protection) to the wall. A layer typically includes plural channels that are separated by channel walls.

Channels are defined by channel walls that may be continuous or may contain gaps. Interconnecting pathways through a monolith foam or felt are not connecting channels.

"Connecting channels" are channels connected to a manifold. Typically, unit operations occur in connecting channels. Connecting channels have an entrance cross-sectional plane and an exit cross-sectional plane. Although some unit operations or portions of unit operations may occur in a manifold, in preferred embodiments, greater than 70% (in some embodiments at least 95%) of a unit operation occurs in connecting channels. A "connecting channel matrix" is a group of adjacent, substantially parallel connecting channels. In preferred embodiments, the connecting channel walls are straight.

The "connection to manifold cross-sectional area ratio" is the ratio of the cross-sectional area of open area of the manifold connection (such as a gate or grate) to the cross-sectional area (perpendicular to the central axis) of the manifold at the position immediately upstream of the connection (for a header) or immediately downstream of a connection (for a footer).

The FA dimensionless number is a means of distinguishing high momentum flow from creeping flow in manifolds:

$$FA = \frac{[0.058 + 0.0023(\ln Re)^2]^2 D}{L_{M2M}} < 0.01$$

where Re is the manifold Reynolds number, D is the manifold hydraulic diameter and $L_{M2M}$ is the manifold length. The header manifold Reynolds number and hydraulic diameter for FA are defined at the position on the channel axis where the wall plane closest to the header entrance belonging to the connecting channel closest to the entrance in the manifold connects with the channel axis. The footer manifold Reynolds number and hydraulic diameter for FA are defined at the position where the wall plane closest to the footer exit belonging to the connecting channel closest to footer exit connects with the channel axis. In this invention, FA should be below 0.01 and for some preferred embodiments 0.001 or less.

A "footer" is a manifold arranged to take away fluid from connecting channels.

A "gate" comprises an interface between the manifold and two or more connecting channels. A gate has a nonzero volume. A gate controls flow into multiple connecting channels by varying the cross sectional area of the entrance to the connecting channels. A gate is distinct from a simple orifice, in that the fluid flowing through a gate has positive momentum in both the direction of the flow in the manifold and the direction of flow in the connecting channel as it passes through the gate. In contrast, greater than 75% of the positive momentum vector of flow through an orifice is in the direction of the orifice's axis. A typical ratio of the cross sectional area of flow through a gate ranges between 2-98% (and in some embodiments 5% to 52%) of the cross sectional area of the connecting channels controlled by the gate including the cross sectional area of the walls between the connecting channels controlled by the gate. The use of two or more gates allows use of the manifold interface's cross sectional area as a means of tailoring manifold turning losses, which in turn enables equal flow rates between the gates. These gate turning losses can be used to compensate for the changes in the manifold pressure profiles caused by friction pressure losses and momentum compensation, both of which have an effect upon the manifold pressure profile. The maximum variation in the cross-sectional area divided by the minimum area, given by the Ra number, is preferably less than 8, more preferably less than 6 and in even more preferred embodiments less than 4.

A "grate" is a connection between a manifold and a single channel. A grate has a nonzero connection volume. In a shim construction a grate is formed when a cross bar in a first shim is not aligned with a cross bar in an adjacent second shim such that flow passes over the cross bar in the first shim and under the cross bar in the second shim.

A "header" is a manifold arranged to deliver fluid to connecting channels.

A "height" is a direction perpendicular to length. In a laminated device, height is the stacking direction. In an non-laminated device, height is the smallest dimension (on average).

A "hydraulic diameter" of a channel is defined as four times the cross-sectional area of the channel divided by the length of the channel's wetted perimeter.

An "L-manifold" describes a manifold design where flow direction into one manifold is normal to axes of the connecting channel, while the flow direction in the opposite manifold is parallel with the axes of the connecting channels. For example, a header L-manifold has a manifold flow normal to the axes of the connecting channels, while the footer manifold flow travels in the direction of connecting channels axes out of the device. The flow makes an "L" turn from the manifold inlet, through the connecting channels, and out of the device. When two L-manifolds are brought together to serve a connecting channel matrix, where the header has inlets on both ends of the manifold or a footer has exits from both ends of the manifold, the manifold is called a "T-manifold".

A "laminated device" is a device made from laminae that is capable of performing a unit operation on a process stream that flows through the device.

A "length" refers to the distance in the direction of a channel's (or manifold's) axis, which is in the direction of flow.

"M2M manifold" is defined as a macro-to-micro manifold, that is, a microchannel manifold that distributes flow to or from one or more connecting microchannels. The M2M manifold in turn takes flow to or from another larger cross-sectional area delivery source, also known as macro manifold. The macro manifold can be, for example, a pipe, a duct or an open reservoir.

A "macromanifold" is a pipe, tube, or duct that connects multiple microdevices to a single inlet and/or outlet. Each microdevice further comprises a manifold for distributing flow to multiple parallel microchannels (i.e., a connecting channel matrix).

A "manifold" is a volume that distributes flow to two or more connecting channels or to a very large aspect ratio (aspect ratios≧30:1) single connecting channel. Aspect ratio is defined as the width of the channel (the flow direction through the volume) over its height. The entrance, or inlet, plane of a header manifold is defined as the plane in which marks a significant difference in header manifold geometry from the upstream channel. The header manifold includes any volume between the entrance plane and the $L_{M2M}$ header beginning point. The exit, or outlet, plane of the footer manifold is defined as the plane which marks a significant difference in the footer manifold channel from the downstream channel. A significant difference in manifold geometry will be accompanied by a significant difference in flow direction and/or mass flux rate. A manifold includes submanifolds if the submanifolding does not cause significant difference in flow direction and/or mass flux rate. The footer manifold includes any volume between the $L_{M2M}$ footer end point and the exit plane. For example, a microchannel header manifold's entrance plane is the plane where the microchannel header interfaces a larger delivery header manifold, such as a pipe or duct, attached to the microchannel device through welding a flange or other joining methods. Similarly, a header manifold starts at the plane where a tub-like, non-microchannel header connects with a microchannel header space. In most cases, a person skilled in this art will readily recognize the boundaries of a manifold that serves a group of connecting channels.

A "manifold connection" is the plane between the manifold and one or more connecting channels. The manifold connection plane can have a volume associated with it for a single connecting channel, and must have a volume if connected through a gate to two or more channels.

A "manifold length" ($L_{M2M}$) is the length of the manifold over its connecting channels. For a header, $L_{M2M}$ is the distance between where the wall plane closest to the header entrance belonging to the connecting channel closest to the header entrance connects with the manifold channel axis, the "$L_{M2M}$ header beginning point", and the position where the wall plane farthest away from the header entrance belonging to the connecting channel farthest away from the header entrance connects with the manifold channel axis, the "$L_{M2M}$ header end point". For a header T-manifolds and header U-manifolds, the $L_{M2M}$ header end point is the midpoint on the line between the two opposite $L_{M2M}$ header beginning points if the channel has a constant cross-sectional area and the $L_{M2M}$ header end point is where the two sides's manifold channel axis lines cross, assuming symmetry between the two manifold sides. For a footer, the $L_{M2M}$ is the distance between the position where the wall plane farthest away from the footer exit belonging to the connecting channel farthest away from the footer exit connects with the channel axis, the "$L_{M2M}$ footer beginning point", and the position where the wall plane closest to the footer exit belonging to the connecting channel closest to the footer exit connects with the channel axis, the "$L_{M2M}$ footer end point". For a header T-manifolds and header U-manifolds, the $L_{M2M}$ header end point is the midpoint on the line between the two opposite $L_{M2M}$ header beginning points if the channel has a constant cross-sectional area and the $L_{M2M}$ header end point is where the two sides's manifold channel axis lines cross, assuming symmetry between the two manifold sides.

The mass flux rate G is the mass flow rate per unit cross-sectional area of the channel in the direction of the channel's axis.

A "microchannel" has at least one internal dimension of 5 mm or less. A microchannel has dimensions of height, width and length. The height and/or width is preferably about 5 mm or less, and more preferably 2 mm or less. The length is typically longer. Preferably, the length is greater than 1 cm, more preferably in the range of 1 cm to 5 m. A microchannel can vary in cross-section along its length, but a microchannel is not merely an orifice such as an inlet orifice.

The ratio of the manifold's head to its friction loss, Mo, is defined by the following equation:

$$Mo = \frac{\frac{1}{2\rho}[G^2 - 0]}{\frac{4fL_{M2M}}{D}\frac{G^2}{2\rho}} = \left\{\frac{4fL_{M2M}}{D}\right\}^{-1}$$

where,

D[m]=manifold hydraulic diameter at the M2M reference point f[dimensionless]=Fanning friction factor for the M2M reference point G[kg/m²/s]=mass flux rate at the M2M reference point The reference point of header manifold Reynolds number and hydraulic diameter for Mo are defined at the position on the channel axis where the wall plane closest to the header entrance belonging to the connecting channel closest to the entrance in the manifold connects with the channel axis. The footer manifold Reynolds number and hydraulic diameter for Mo are defined at the reference point at the position where the wall plane closest to the footer exit belonging to the connecting channel closest to footer exit connects with the channel axis. In preferred embodiments, Mo is greater than 0.05.

A module is a large capacity microchannel device, made up of multiple layers of repeating unit combinations.

An "open channel" is a gap of at least 0.05 mm that extends all the way through a microchannel such that fluids can flow through the microchannel with relatively low pressure drop.

"Process channel volume" is the internal volume of a process (i.e., connecting) channel. This volume includes the volume of the catalyst (if present) and the open flow volume (if present). This volume does not include the channel walls. For example, a reaction chamber that is comprised of a 2 cm×2 cm×0.1 cm catalyst and a 2 cm×2 cm×0.2 cm open volume for flow immediately adjacent to the catalyst, would have a total volume of 1.2 cm$^3$.

Quality Index factor "$Q_1$" is a measure of how effective a manifold is in distributing flow. It is the ratio of the difference between the maximum and minimum rate of connecting channel flow divided by the maximum rate. For systems of connecting channels with constant channel dimensions it is often desired to achieve equal mass flow rate per channel. The equation for this case is shown below, and is defined as $Q_1$.

$$Q_1 = \frac{m_{max} - m_{min}}{m_{max}} \times 100\%$$

where $m_{max}$[kg/sec]=maximum connecting channel mass flow rate $m_{min}$[kg/sec]=minimum connecting channel mass flow rate For cases when there are varying connecting channel dimensions it is often desired that the residence time, contact time, velocity or mass flux rate have minimal variation from channel to channel such that the required duty of the unit operation is attained. For those cases we define a quality index factor $Q_2$:

$$Q_2 = \frac{G_{max} - G_{min}}{G_{max}} \times 100\%,$$

where G is the mass flux rate. For cases when all the connecting channels have the same cross sectional area, the equation for $Q_2$ simplifies to $Q_1$. The quality index factor gives the range of connecting channel flow rates, with 0% being perfect distribution, 100% showing stagnation (no flow) in at least one channel, and values of over 100% indicating backflow (flow in reverse of the desired flow direction) in at least one channel. For the examples, $Q_1$ and $Q_2$ are unadjusted; however, in the claims, $Q_1$ and $Q_2$ are defined based on the channels that comprise 95% of the net flow through the connecting channels, the lowest flow channels are not counted if the flow through those channels is not needed to account for 95% of the net flow through the connecting channels. The Quality factor is preferably 5% or less, more preferably 2%, and still more preferably 1% or less; and in some embodiments is in the range of 0.5% to 5%.

Ra ($=A_{max}/A_{min}$) is the cross-sectional area ratio of the biggest to the smallest connection between a manifold and connecting channels. These areas can belong to gates or grates.

The Reynolds number, Re, is the commonly used ratio of the inertial over the viscous forces seen by flow in a channel. Its definition is the ratio of the mass flux rate (G) times the hydraulic diameter (D) divided by the dynamic viscosity ($\mu$), $$Re = \frac{GD}{\mu} = \frac{\rho U D}{\mu}$$

The value of the Reynolds number describes the flow regime of the stream. While the dependence of the regime on Reynolds number is a function of channel cross-section shape and size, the following ranges are typically used for channels:

Laminar: Re<2000 to 2200

Transition: 2000-2200<Re<4000 to 5000

Turbulent: Re>4000 to 5000

"Sheets" or "shims" refer to substantially planar plates or sheets that can have any width and length and preferably have a thickness (the smallest dimension) of 5 millimeter (mm) or less, more preferably 0.080 inch (2 mm) or less, and in some preferred embodiments between 50 and 1000 µm. Width and length are mutually perpendicular and are perpendicular to thickness. In preferred embodiments, a sheet has length and width that are coextensive the length and width of the stack of laminae in which the sheet resides. Length of a sheet is in the direction of flow; however, in those cases in which the direction of flow cannot be determined, length is the longest dimension of a sheet.

A "subchannel" is a channel that is within a larger channel. Channels and subchannels are defined along their length by channel walls.

A "sub-manifold" is a manifold that operates in conjunction with at least one other submanifold to make one large manifold in a plane. Sub-manifolds are separated from each other by continuous walls.

"Thickness" is measured in the stacking direction.

In a "U-manifold," fluid in a header and footer flow in opposite directions while being at a non zero angle to the axes of the connecting channels. When two U-manifolds are brought together to serve a connecting channel matrix, with entrances on both open ends of the header manifold and exits on both open ends of the footer, the manifold is called an "I-manifold".

"Unit operation" means chemical reaction, vaporization, compression, chemical separation, distillation, condensation, mixing, formation of solid or liquid in suspension of either a liquid or a gaseous fluid, formation of a gaseous bubble in a liquid suspension, heating, or cooling. A "unit operation" does not mean merely fluid transport, although transport frequently occurs along with unit operations. In some preferred embodiments, a unit operation is not merely mixing.

In a "Z-manifold," fluid in a header and footer flow in the same direction while being at a non zero angle to the axes of the connecting channels. Fluid entering the manifold system exits from the opposite side of the device from where it enters. The flow essentially makes a "Z" direction from inlet to outlet.

BRIEF DESCRIPTION OF THE FIGURES

FIG. 1$b$ illustrates a model of a connecting microchannel set after bonding (see FIG. 1$a$), where the microchannel to the farthest left has a higher flow resistance than the microchannel to the farthest right.

DETAILED DESCRIPTION OF THE INVENTION

Figure 1A:
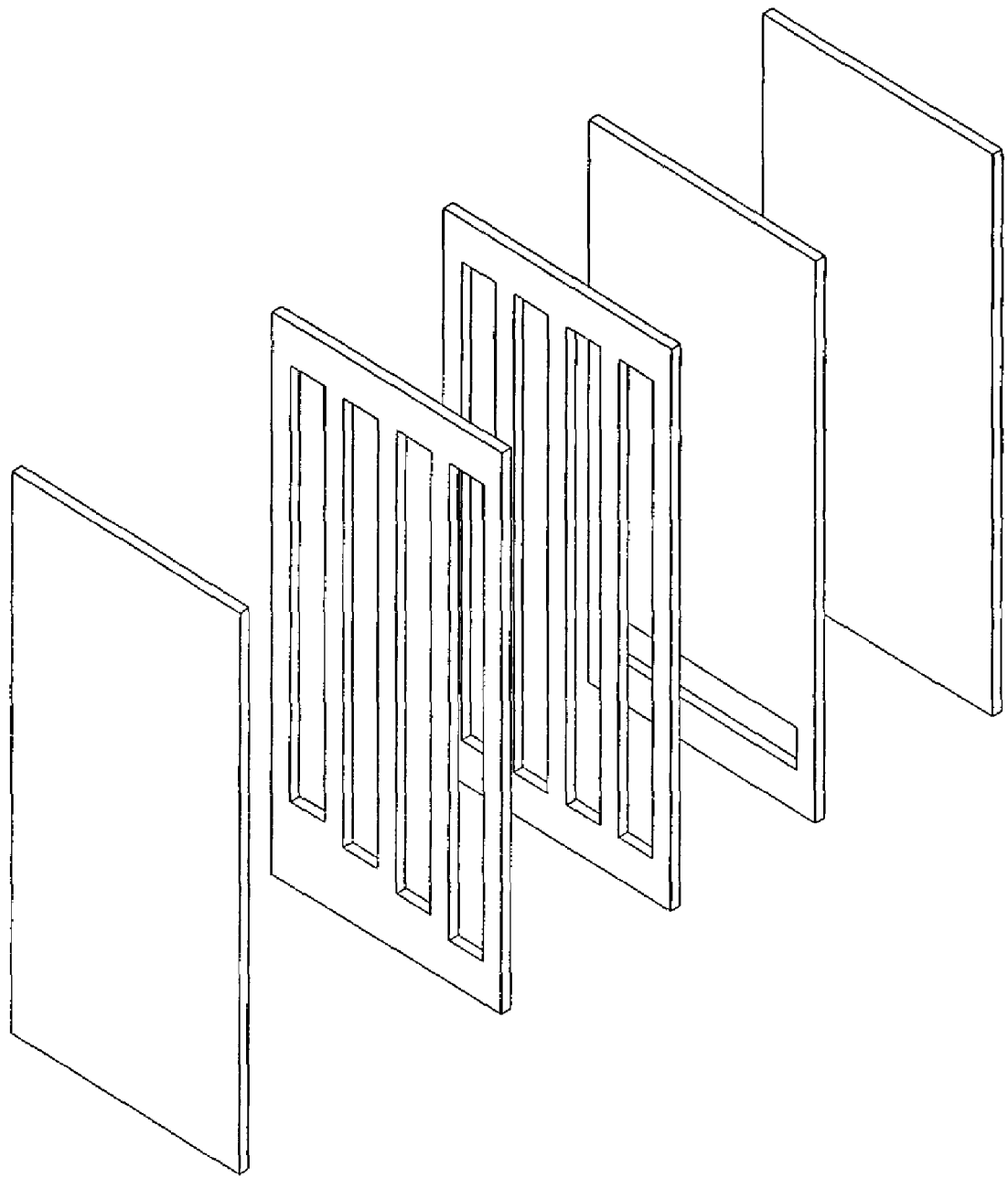
FIG. 1$a$ illustrates stack of lamina designed to create varying channel heights along the length of a microchannel to make the pressure drop and flow in a group of connecting channels more uniform.
Figure 1B:
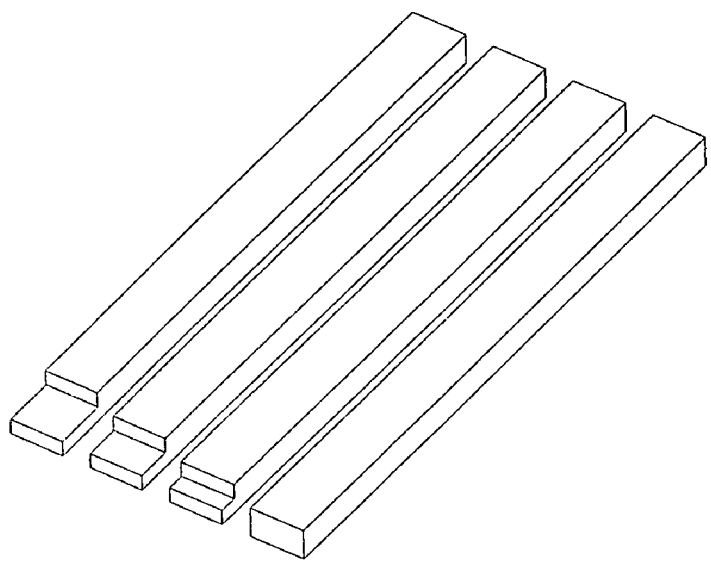

In a preferred embodiment, connecting channel heights may be altered or reduced for varying lengths to control the pressure drop and thus flow distribution to many parallel microchannels. In this embodiment, the process flow microchannel is comprised of at least two or more shims or lamina that are stacked on top of each other. Each shim contains through slots and are stacked between two wall shims to form a hermetically sealed microchannel after bonding. For example, two lamina with through slots can be stacked to form the microchannel height, the first lamina may have a shorter slot than the at least second lamina. The resulting microchannel would have a first height for a first distance along the length of the microchannel before opening to the second height which represents the combined height of the at least two slots stacked on top of each other. It should be noted that the final channel height after diffusion bonding may be slightly smaller (e.g., up to 10% smaller) as a result of the compressive nature of the diffusion bonding process. In preferred embodiments, there may be two, three, five, ten, or more different first lengths of the first height of parallel microchannels.

In some embodiments, in a second channel, a first height (reduced cross-sectional area) as represented by the shim thickness of a first lamina would have second length that is longer than the first length in the first channel. The resulting pressure drop in the second channel would be larger than the pressure drop in the first channel. A third channel and so on could have a third length of the first height that is preferably longer than the second length (as shown in the fig.). This design corrects for momentum effects of flow into plural connecting channels.

In some embodiments, the lengths of reduced cross-sectional area may be utilized anywhere in the channels, or in multiple places in the channels, not just near or adjacent to the manifold. Possible locations for these flow distribution features include adjacent to the inlet manifold, adjacent to the outlet manifold, or anywhere in the channels which connect to the manifold(s) or sub-manifolds, in any sub-manifold sections, when present, or any combination of the preceding locations. This offers a distinct advantage over conventional manifold designs, in that these features can be placed in strategic locations where they can serve more than one purpose, such as adding stability by connecting long ribs between continuous channels, providing enhanced mixing, providing more uniform flow distribution over a wider range of flow rates, and providing less sensitivity to tolerance in the channel dimensions. Flow distribution features may also be included in multiple locations in each channel to better provide a more uniform pressure at points in channels where interconnectedness is present, thereby minimizing flow redistribution among channels at those points.

Another potential advantage of the present invention over conventional flow distribution techniques is more robust performance over a wider range of flow rates. For instance, in one embodiment for which the flow distribution features in each channel differ only in length (rather than cross section), the contraction and expansion losses in each channel are similar, and the resistance to flow scales more linearly with flow rate in each channel than for other types of flow distribution features which rely on different magnitudes of contraction and expansion losses (flow resistance) in each channel. In cases where the majority of flow resistance in each flow path scales more or less linearly, such flow distribution features will give a more robust flow distribution (more uniform) over a wider range of flow conditions.

The microchannels may be made of two or three or more lamina with slots stacked on top of each other. The microchannels may have a first height, a second height, and a third height or more. There may also be a corresponding first length, second length, and third length or more. In an alternate embodiment, a first length having a first height may be adjacent to a second length having a second height. The second length can be adjacent to a third length having a third height, etc.

This method of tailoring the pressure drop in each microchannel to improve the flow distribution is especially useful for a method of manufacturing that relies on stacking stamped lamina. In some cases, it is preferable to use a nibbling approach to stamping such that minimal additional stamping dies are required to form the first and second or more lengths of microchannels that maintain the first height. In this approach, the lamina is preferentially held on a table that has controls to move in both the x and y directions. The shim or lamina is moved such that a die stroke cuts the desired length of through slot in each lamina. In the nibbling process, die strokes cut a fraction of the total slot length and then move to cut an adjacent slot. The adjacent slot may be connected or nearby the first slot. A die stamp that is 5 cm, as an example, can cut a full slot of 5 cm in a single stroke, or can cut a shorter slot of 4.97 cm or 4.8 cm or 3.8 cm or 2.5 cm or any dimension in a single stroke within the tolerance of the x-y table controls for moving the lamina. Overall the die can cut a larger slot, but the lamina must move for the die to create a larger slot. The length of the die stamp does not change, but rather the lamina moves such that the die stamps over a previously cut or stamped region while simultaneously cutting a fresh section of metal less than the full die length. By this manner, minimal additional fabrication complexity is added to form a first channel with a first height and a first length adjacent to a second channel with a first height and a different second length for purposes of controlling flow distribution.

In an alternate embodiment, two lamina may be stacked on top of each other to form a microchannel, where one or both lamina are partially etched to create an analogous first length and first height that is different from the second length and second height. One lamina may be partially etched, while the second or third or more lamina have through slots that are all stacked to form the microchannel.

In an alternate embodiment, flow restrictions may be placed within the micromanifold region rather than or in addition to the microchannels. The method of stacking lamina with through slots or openings is especially helpful for this approach. A first length of the first height in the first submanifold may be longer than the second length of the first height of the second submanifold. By this manner, pressure drop in one submanifold may be made more uniform between the first and second submanifold to improve the flow distribution between the at least first and second submanifold.

The method of controlling flow distribution by varying cross-sectional area within microchannels may be particularly preferred for cross flow microchannels that do not have a sub-manifold region that distributes flow laterally across a device; instead a large open or macromanifold opening may be connected to the face of an open set of parallel microchannels. In this case, flow distribution may be controlled by creating a first length of a first height in a first microchannel that is different from a first height of a second length in the at least second microchannel. The first and second length may be made by stacking stamped lamina, or it may be made by partially removing material from a single lamina such that a continuous first microchannel has a first height for a first length and a second height for a third length along the microchannel length and a continouous second microchannel has a first height for a second length and a second height for a fourth length. In an alternate embodiment, the lamina may contain at least a first microchannel with a first height for a first length and a second height for a third length. In addition the lamina may contain at least a second microchannel with a third height for a fifth length and a fourth height for a six length. Any combination of heights and lengths of sections along a continuous microchannel may be possible.

In some preferred embodiments, the width of each microchannel is substantially constant along its length and each channel in a set of connecting channels have substantially constant widths; "substantially constant" meaning that flow is essentially unaffected by any variations in width. For these examples the width of the microchannel is maintained as substantially constant. It is preferred to maintain the width of the microchannel constant because this width is an important parameter in the mechanical design of a device in that the combination of microchannel width with associated support ribs on either side of the microchannel width and the thickness of the material separating adjacent lamina or microchannels that may be operating at different temperatures and pressures, and finally the selected material and corresponding material strength define the mechanical integrity or allowable temperature and operating pressure of a device. If the width were allowed to vary across a lamina, such as in the Goldbig et al. reference, then the material thickness between adjacent lamina would have to be sized based on the widest microchannel. As such, additional material would be required for this design. In addition, varying microchannel widths would require multiple tooling for stamping and increase the complexity of fabrication.

Improving Flow Distribution While Improving Heat Transfer Characteristics

Figure 2:
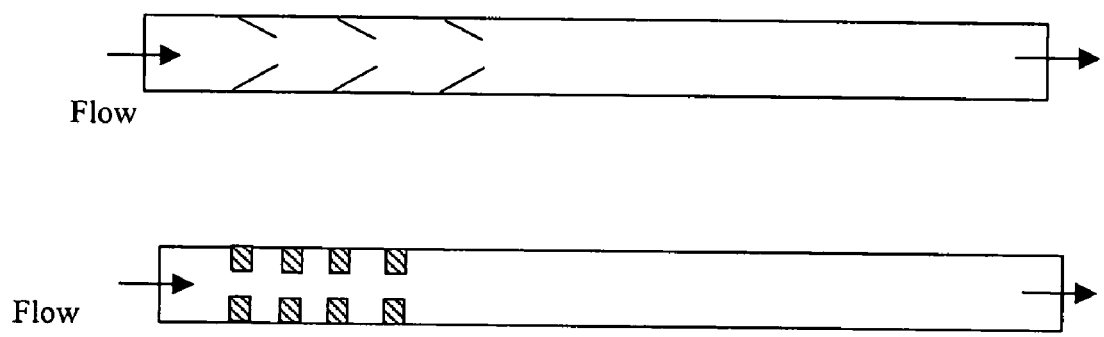
FIG. 2 shows schematic examples of features (such as vanes or pegs) that enhance heat transfer characteristics while regulating the flow in connecting channels.

Features like protrusions can be added to the parallel connecting channels to serve a dual purpose. The size of the features can be used to regulate the channel to channel pressure drop variation which provides control on distributing flow among the connecting channels. Besides, the features provide improvement in the heat transfer characteristic of the channel. The features could be protrusions from the wall with any shape like round, square, pyramidal etc. Some of the shapes of the features are shown in FIG. 2. These features can be located only at a portion of the connecting channels.

Calculated Example—Flow Distribution in Connecting Channels

Figure 3:
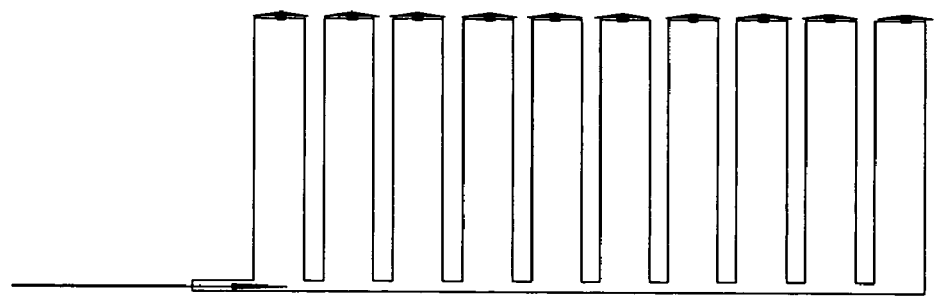
FIG. 3 Geometry assumed for flow distribution case study, with manifold and channel heights of 1.02 mm (out of plane of page).
Figure 4:
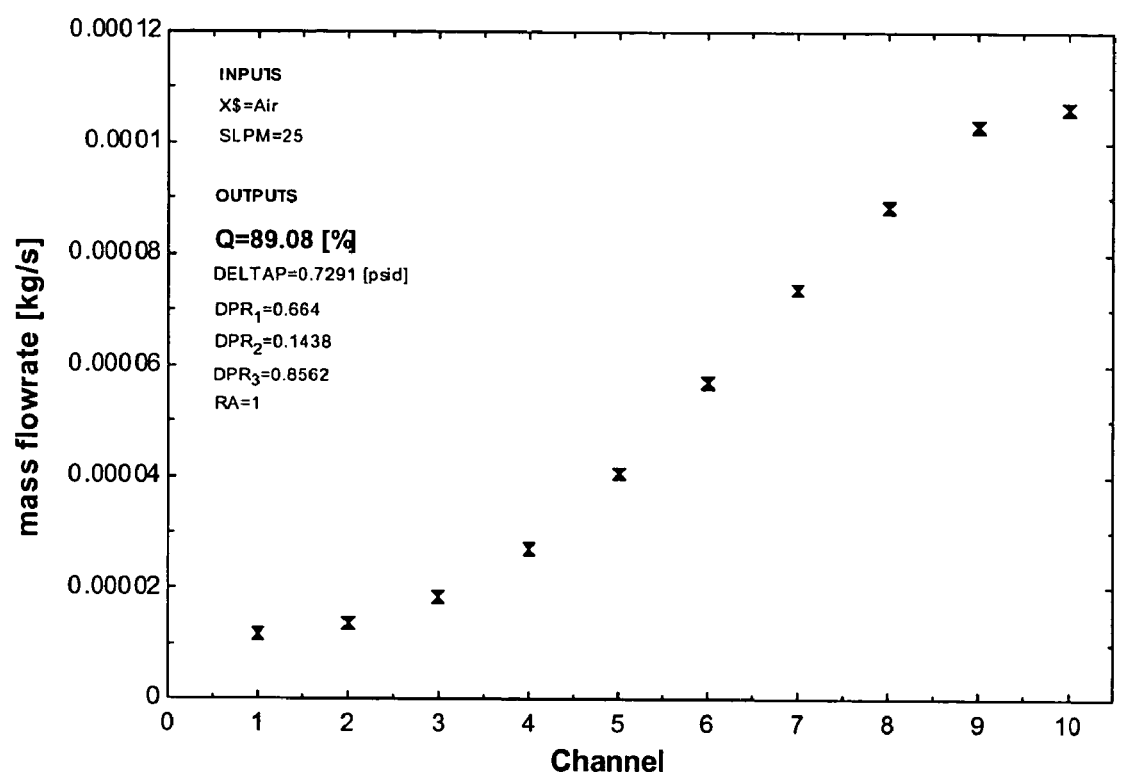
FIG. 4 shows the flow distribution by channel for baseline case without features of the present invention.

The present invention was used in conduction with a flow distribution model to dramatically improve the predicted flow distribution uniformity for 25 SLPM of air at 25° C. and 1.01 bar outlet pressure among ten channels connected to a common inlet manifold. For this example the dimensions of each channel were 1.02 mm by 4.06 mm wide extending 25.4 cm long. Each channel was separated by a 1.52 mm wide wall (for a total of 5.59 mm from leading edge to leading edge of adjacent channels). The common manifold was 1.02 mm gap by 10.16 mm width and 54.4 mm in length is defined in the direction of the inlet flow stream and orthogonal to the direction of flow in the parallel microchannels, as shown in FIG. 3. The model gave a predicted flow distribution quality factor of >89% for the geometry described above without the use of the present invention. The model results for this baseline case are shown in FIG. 4. The predicted pressure drop for the baseline case was 5027 Pa.

Figure 5:
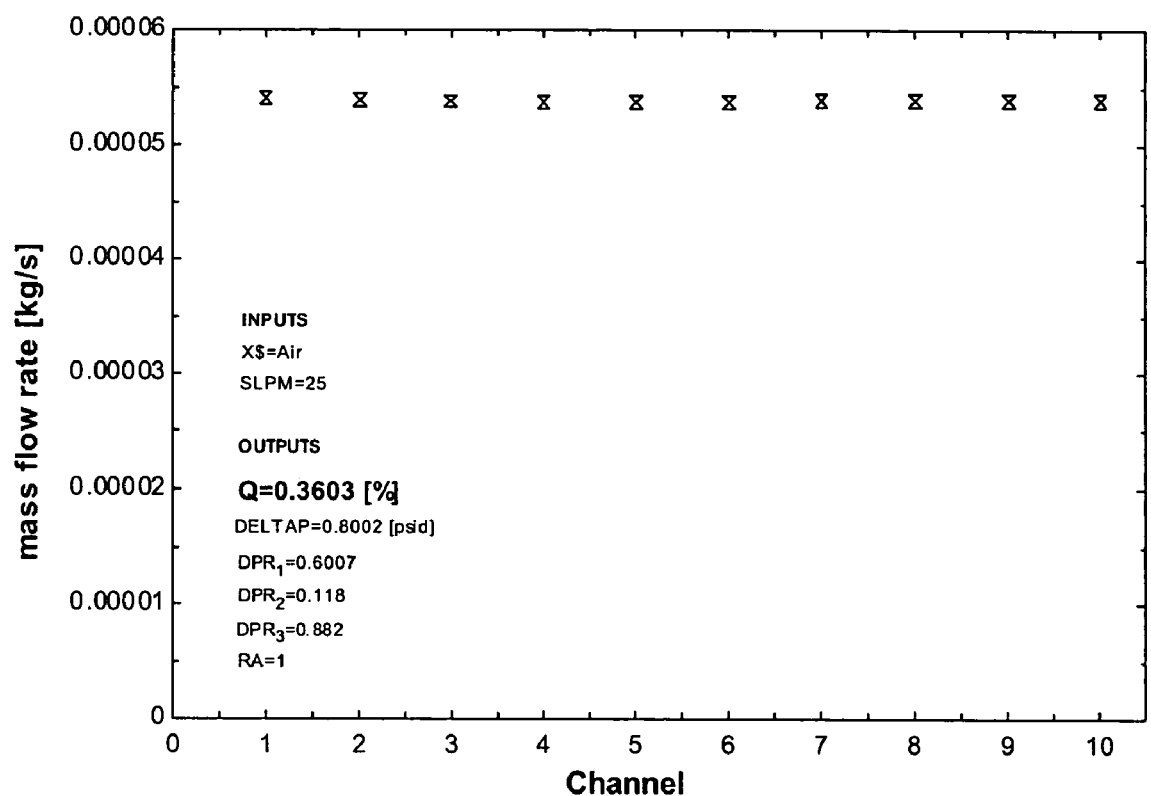
FIG. 5 shows the flow distribution by channel for the case including flow distribution features of the present invention.

A second case was run with the same geometry except that flow distribution features which reduced the channel gap from 1.02 mm to 0.25 mm were added in the portion of each channel which is connected to the manifold. These features created channel dimensions of 0.25 mm by 4.06 mm wide, with varying lengths designed to minimize the quality factor (that is, maximize the degree of flow distribution uniformity). The total length of each channel, including the flow distribution features was maintained constant at 25.4 cm. With the flow distribution features included, a quality factor of <0.4% was predicted. The flow distribution feature lengths for each channel are shown in Table 1, and the resulting flow distribution is depicted in FIG. 5. The predicted pressure drop for the case including the inventive features was 5517 Pa (490 Pa higher than the baseline case without the features). In Table 1, the channels with the longest length features have the most flow resistance in the microchannel. These values were obtained by iteratively changing the flow distribution feature length at each successive iteration by a factor proportional to the mass flow through the channel predicted for the previous iteration. These factors may be normalized such that their average value is 1. Although an infinite number of solutions may exist which provide adequate flow distribution uniformity, shorter lengths tend to minimize pressure drop, and the shortest length should not be less than is practical for manufacturing purposes.

TABLE 1

Lengths of flow distribution features used in the case study.

| Channel | Length (mm) |
|---|---|
| 1 | 0.711 |
| 2 | 2.108 |
| 3 | 3.734 |
| 4 | 5.309 |
| 5 | 6.706 |
| 6 | 7.899 |
| 7 | 8.052 |
| 8 | 8.331 |
| 9 | 8.585 |
| 10 | 8.738 |

M2M Design with Partial Etching Fabrication Method

Chemical etching of thin material sheets can provide a wide variety of feature design and shape patterns within a sheet with tight tolerances which would be very difficult to obtain by conventional machining process. Other methods of fabrication may also achieve similar designs, including laser etching, electroforming, and others. The general attributes of this preferred embodiment is to create features that connect to the base of the shim or laminae which are not necessarily otherwise connected to the sides of the laminae. In other words, the features may be islands that project up from the base to create a functional feature.

Figure 6:
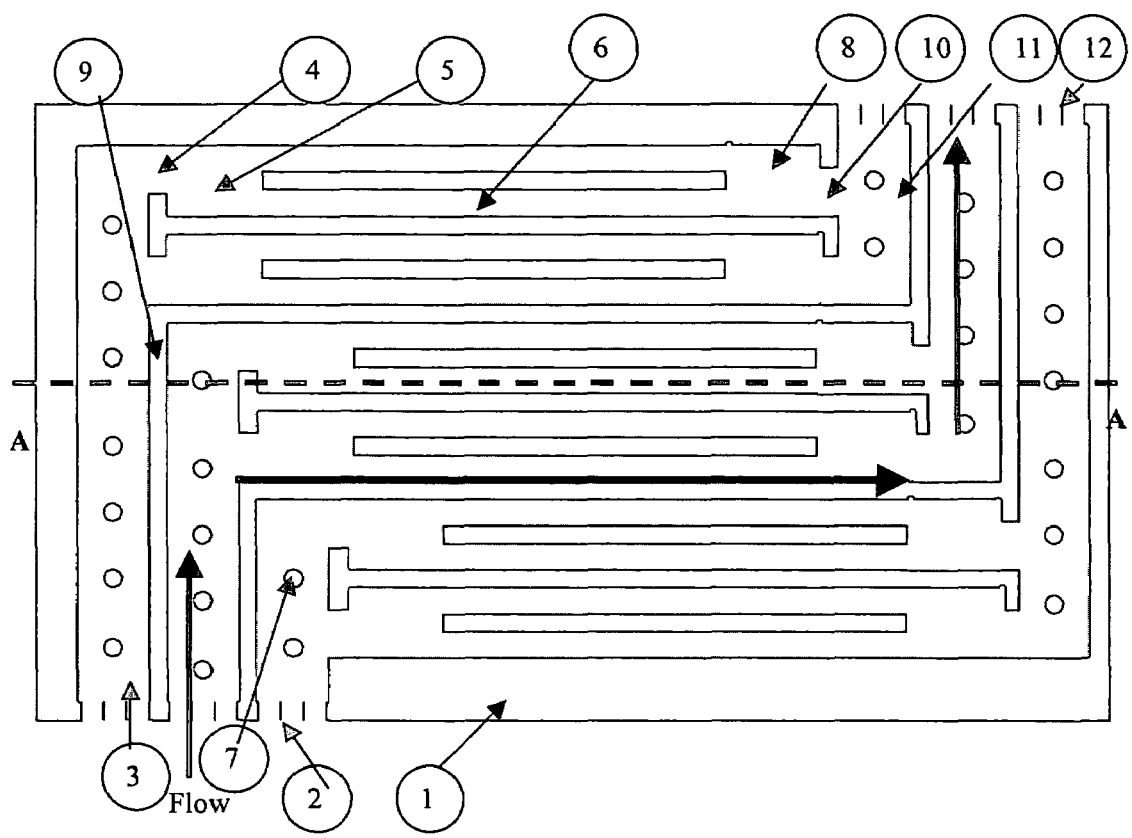
FIG. 6 schematically illustrates a flow distribution manifold design (Z manifold).

FIG. 6 shows a schematic of general concept of manifold, connecting channels and the connections in between on a shim. A shim containing manifolds or submanifolds is sometimes referred to as "a manifold shim".

A material 1 (such as metal, polymer, etc.) can be etched away to leave a shim configuration such as that illustrated in FIG. 6. In one embodiment, the shim is etched only on one side. In another embodiment, the shim is etched from both sides; the etching is only partial and, unlike conventional stamping, does not etch through to the other side of a sheet. In the embodiment when the shim is etched on both sides, the depth of etching on one side of the shim may be different or the same as the depth of the etching on the other side.

A fluid enters the shim through 2 which are multiple small cross-sectional openings. The flow then enters 3 which is referred to as an inlet sub-manifold. The inlet sub-manifolds are separated from each other by ribs 9.

Figure 7:
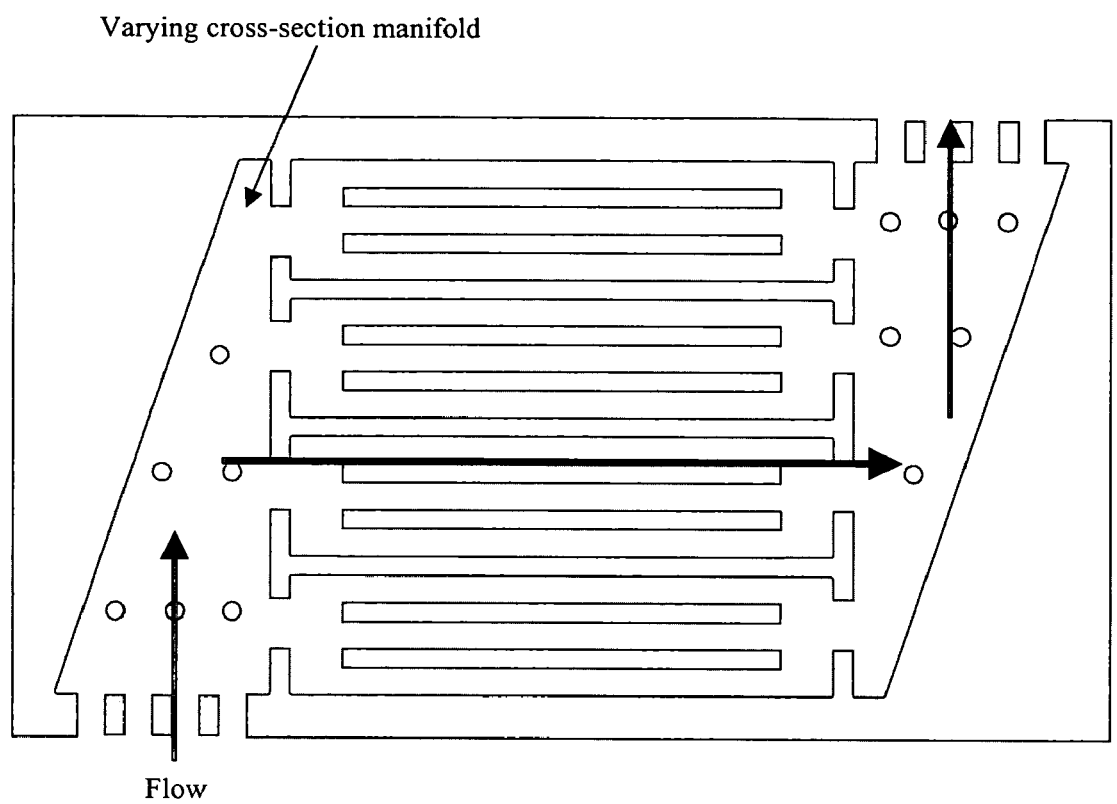
FIG. 7 illustrates a shim design having manifolds with varying cross-section.

In one embodiment the inlet sub-manifold is rectangular in cross-section as shown in FIG. 6 (assuming a constant depth). In another embodiment, an inlet manifold has varying cross-section (preferably decreasing in volume as distance from the inlet increases) as shown in FIG. 7. The variation in the cross-section of the inlet sub-manifold can be continuous (as shown in FIG. 7) or in steps. Also, although it isn't shown in the top-down views of the figures, it is possible to vary depth of the sub-manifold to obtain a desired change in volume.

Figure 8:
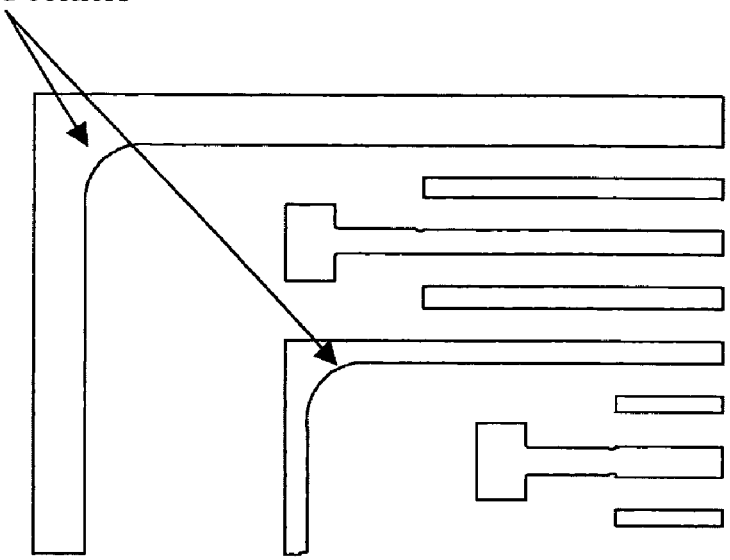
FIG. 8 illustrates rounded corners of sub-manifolds.

In one embodiment the inlet manifold has sharp corners. In another embodiment the manifold has rounded corners as shown in FIG. 8.

For a given space for inlet manifolds in a shim, the number of inlet sub-manifolds in a shim can be increased by reducing the rib thicknesses between the sub-manifolds. In one embodiment, the number of inlet sub-manifolds is such that the Reynolds number in a sub-manifold is less than 2300.

Within each inlet sub-manifold, there are optional pressure support features, 7, which may or may not be needed, depending on conditions. The pressure support features can be in any shape or size however the height of these features is same as the depth of the etching. These features support the differential pressure between the streams in the inlet sub-manifold section. Also the features act like obstructions and may result in increase in pressure drop. The shape, size and number of pressure support features should be determined from the overall pressure drop requirements and stress requirements.

The flow from inlet sub-manifolds enters inlet gates, 4 followed by inlet flow straightener 5. In one embodiment, one inlet sub-manifold has 2 inlet gates. In another embodiment, one inlet sub-manifold has a number of inlet gates equal to the number of connecting channels 6 in each sub-manifold.

Figure 9:
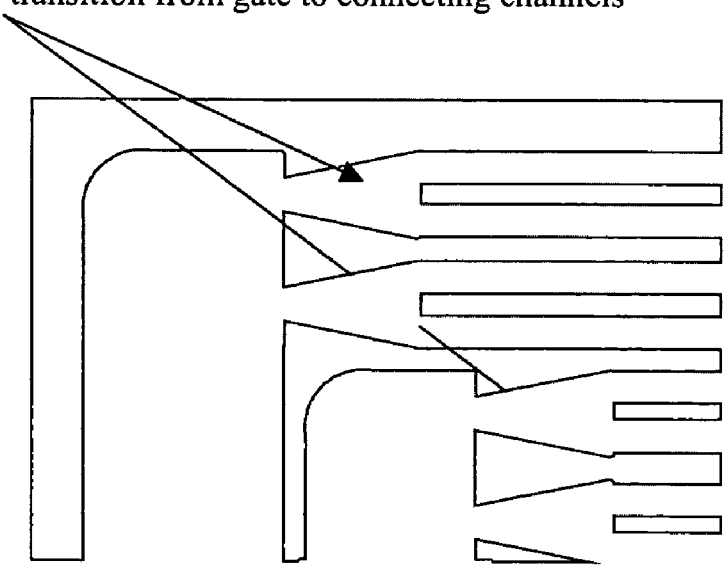
FIG. 9 illustrates a gradual transition from gate to connecting channels.

The inlet flow straightener reduces any directional component of flow perpendicular to connecting channels. In one embodiment, the transition of flow from the inlet gates to the connecting channels can be abrupt through the inlet flow straightner as shown in FIG. 6. In another embodiment the transition of the flow from the inlet gates to the connecting channels is gradual as shown in FIG. 9. The corners of inlet gates and inlet flow straightners can be sharp or rounded.

Figure 10:
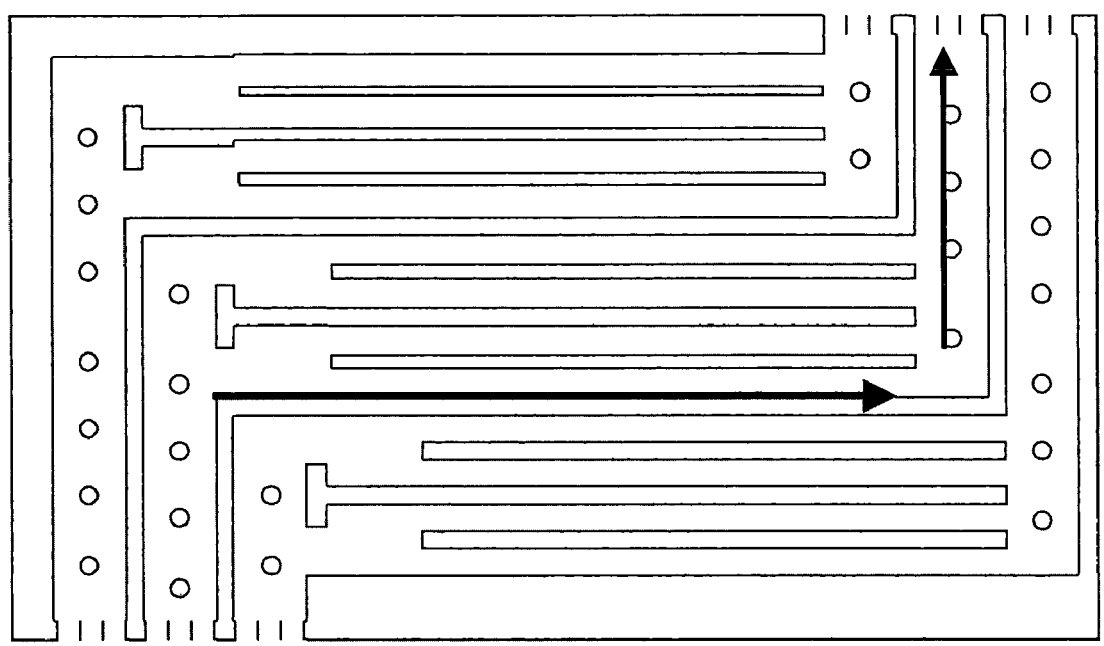
FIG. 10 illustrates the connection of connecting channels directly to exit sub-manifolds

The flow then enters the connecting microchannels. The number of connecting channels may be varied from submanifold to submanifold or may be similar across the width of the shim. The connecting channels are separated from each other by ribs that do not allow the flow to communicate in the process (connecting) channels. In an alternate embodiment, the ribs may be discontinuous and permit some fluid communication between parallel microchannels. In this embodiment, the fluid communication may permit a flow redistribution and improved or a reduced quality index. The flow will then exit the device through exit flow straightener 8, exit gate 10, exit sub-manifold 11 and exit openings 12. Exit flow straighteners, exit gates and exit sub-manifolds may have the same characteristics as inlet flow straightner, inlet gates and inlet sub-manifolds respectively. In one embodiment the connecting channels were directly connected to exit sub-manifold as shown in FIG. 10. In another embodiment the inlet sub-manifolds are directly connected to the channels while exit flow straightener, exit gates, exit sub-manifolds are used at the exit of the device.

In some embodiments, manifold shims and wall shims (wall shims are typically blank, that is, featureless) are alternatively stacked in a repeating fashion to create a prebonded device or subassembly. In one embodiment, at least one manifold shim is different from the other manifold shims in a stack of at least 6 shims containing at least 3 pairs of repeating manifold/wall shims. In another embodiment all the manifold shims are different in design from other manifold shims.

In one embodiment, manifold shims are stacked face-to-face such that the features are aligned. In another embodiment, only manifolds (or only manifolds and submanifolds) are aligned face-to-face; that is, one of the shims is featureless except for manifolds (or except for manifolds and submanifolds); in this embodiment, flow enters the manifold (or sub-manifold) sections of the manifold shim and the opposing shim (patterned with manifolds or submanifolds) and then flows in the gates and connecting channels of the manifold shim. At the exit sub-manifold, the flow in two face-to-face manifold shims may recombine in a manifold or sub-manifold formed by the face-to-face manifold shims and exit the device. The embodiments in which only manifold regions are paired in a face-to-face fashion (and thus have greater heights than the connecting channels) is often advantageous because connecting channels are kept small for superior heat transfer, while heat transfer may not be desired in the manifold regions.

In some preferred embodiments, the number of submanifolds is set to reduce the total flowrate in any submanifold such that laminar flow is maintained. Laminar-only flow in a submanifold will result in a lower pressure drop per unit length as compared to transition or turbulent flow.

Use of Flow Straightener and Flow Distribution Section to Improve Intra-Gate Flow Distribution in Connected Channels.

One problem observed with previous designs (including some designs described in Fitzgerald et al., U.S. Published Patent Application No. US2005/0087767) is that the gate connection to the M2M manifold has little flow resistance once the fluid enters the gate itself. This can be problematic, as fluid flow through a header gate may not enter the gate with its flow substantially normal to the plane of the gate. It will enter at an acute angle to the channel, and not proceed in the normal direction to gate. It will then enter with its average momentum entering the redistribution zone downstream of the gate with a non-normal direction, which will cause it to favor the connecting channels downstream of the gate that are on the side the momentum is carrying it to. This leads to sometimes large intra-gate quality index factors. The momentum of the stream is the mass-weighted average directional velocities of the stream at the interfacial plane between the gate and the M2M manifold channel, and can be calculated from most computation fluid dynamics codes for one skilled in the art.

With this in mind the following concept is used to improve the flow distribution with two connected channel sections: a flow straightener at the manifold interface, and a flow distribution section at the two or more connecting channels. The concept uses a first section of the gate opening or the manifold opening and an adjoining channel of sufficient length normal to the gate opening to straighten the flow between the end of the channel and the gate-M2M interface. Between the flow straightener and the connecting channels is a second section with an increase in cross-sectional area, which may be gradual or abrupt, in between the first section and the connecting channels to add flow resistance for flow to or from the two or more connecting channels. A comparison of a prior art design and one example of the new design is shown in FIG. 11.

Figure 11:
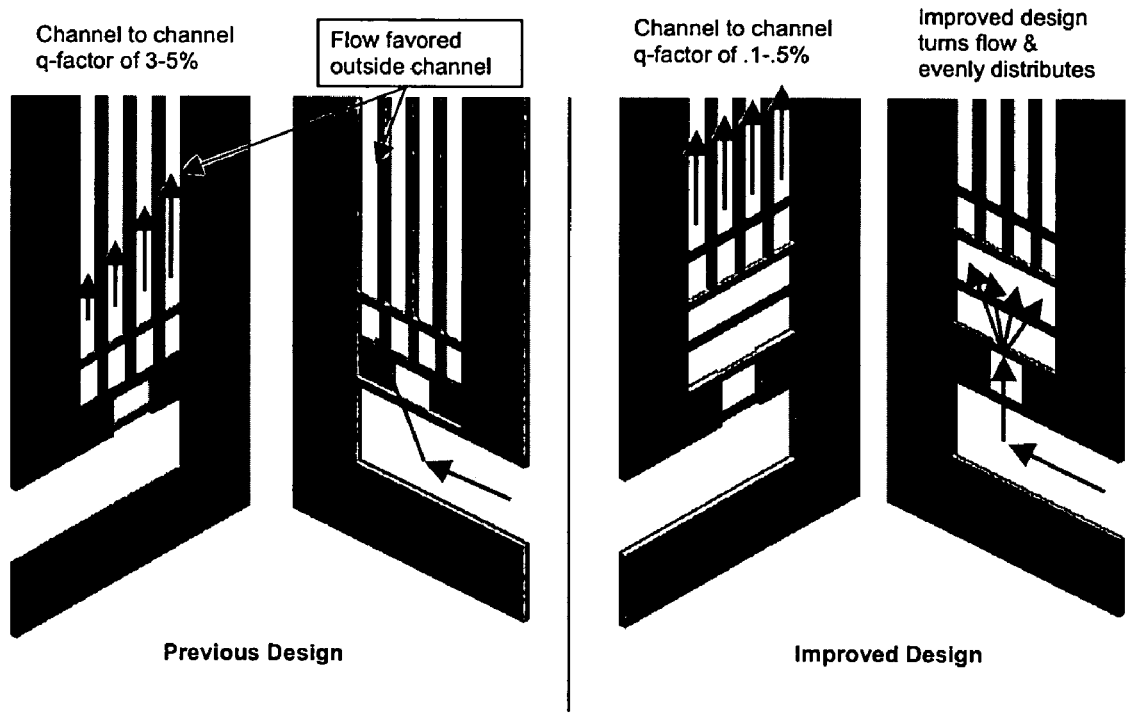
FIG. 11 shows shim designs comparing a prior art design with a design of the present invention.

The first section can be a straight extension of the gate cross-sectional area (as shown in FIG. 11), or it can have varying cross-sectional area. Some embodiments of the flow straightener could include: a continuously decreasing cross-sectional area, a series of sudden contractions to help straighten the flow or sudden expansions or combinations of contractions and expansions.

For laminar flow through the flow straightener, the flow straightener preferably has an exit hydrodynamic dimensionless length $x^+$ is at least 0.005, and more preferably $x^+ > 0.01$, or most preferably $x^+ > 0.05$, where hydrodynamic dimensionless length is:

$$x^+ = \frac{L_{st}}{Re_{st} D_{st}}, \text{ where}$$

$L_{st}[m]$=Length of the flow straightener; $Re_{st}[-]$=Reynolds number of fluid in the flow straightener; and $D_{st}[m]$=is the hydraulic diameter of the flow straightener. The length of a flow straightener is determined in the normal direction to the manifold connection area, and in the case where the flow straightener varies in cross-sectional area along its length, the diameter $D_h$ is the average hydraulic diameter over the length of the flow straightener.

For transition and turbulent flow through the flow straightener, preferably with a length of the first section to first section hydraulic diameter is at least 3:1, more preferably at least 5:1 and more preferably at least 10:1. The goal of the flow straightener is that the average momentum vector of the stream leaving the flow straightener has smaller angular difference from the normal vector of the manifold/channel interface plane, as compared to flow entering the flow straightener. The preferred exit angle from the flow straightener is less than 35°, more preferably less than 15°, and still more preferably less than 5°.

Figure 12:
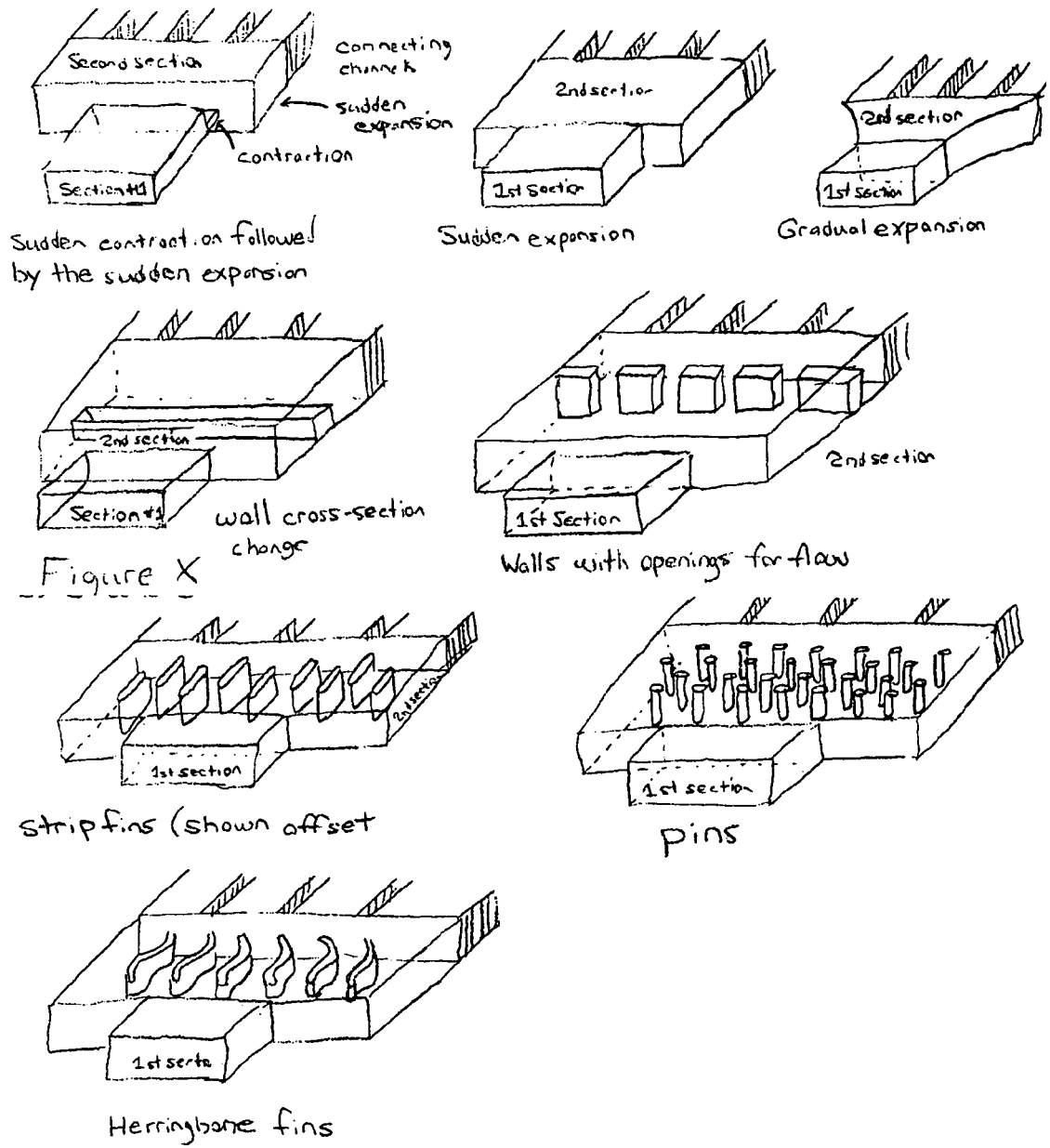
FIG. 12 schematically illustrates several embodiments for flow straighteners and flow distribution sections. Section 1 refers to the flow straightener and section 2 (or $2^{nd}$ section) refers to the flow distribution section.

The flow distribution section must have at least one cross-sectional area increase from the flow straightener (expansions in the width or height, or both). The flow distribution section may contain only open space, or may contain flow disruption elements such as cross-bars, partial barriers, strip fins, pins, or wavy fins. FIG. 12 shows some examples of these concepts.

Figure 13:
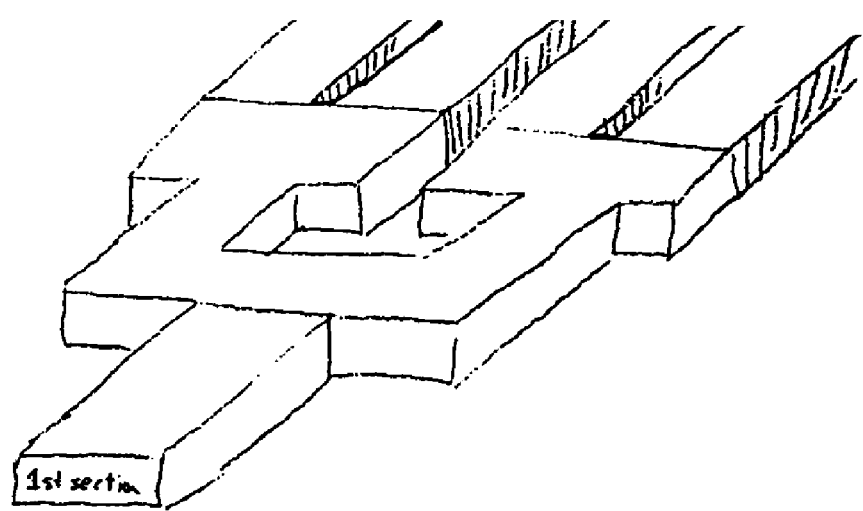
FIG. 13 illustrates channel bifurcation in a flow distribution section.

The flow distribution section could use bifurcated channels (an example of bifurcated channels can be seen in Amador, C., A. Gavriilidis, P. Angeli, "Flow distribution in different microreactor scale-out geometries and the effect of manufacturing tolerances and channel blockage," *Chem. Eng. J.*, vol. 101, pp. 379-290, 2004). FIG. 13 shows an example of bifurcation.

EXAMPLE—MODELING OF FLOW IN A Z-MANIFOLD

The new gate design was modeled in a z-manifold in with the header gate of a single gate system. This system was modeled in computational fluid dynamics using the code Fluent 6.2.16. It is made from two solid laminates, laminate 1 of 0.025 cm (0.010") thickness and laminate 2 of 0.046 cm (0.018") flanked by two walls. The model system consists of the following flow paths:

1. A M2M manifold that is 1.270 cm (0.500") in width, 0.071 (0.028") tall gap and 3.353 cm (1.320") length. The length of the M2M manifold upstream of the header gate is 2.083 cm (0.820") and 0.406 cm (0.160") downstream of the header gate that ends the header M2M manifold. The M2M manifold is made up of laminates 1 and 2. The inlet has a constant mass flow rate inlet condition. The $L_{M2M}$ is 2.083 cm.
2. A header gate that is 0.046 cm tall, 1.270 cm (0.500") wide and 0.152 cm (0.060") long, in laminate 2.
3. The first section, or flow straightener, of length 0.635 cm (0.500"), gap height 0.071 cm and 1.270 cm wide, found in laminates 1 and 2. The $L_{st}/D_{st}$=9.4.
4. The second part of the first section has a sudden contraction to 0.025 cm gap height, 1.270 cm of width and 0.152 cm in length.
5. The first part of the flow distribution section, or section two, is a 0.071 cm tall gap, a 0.610 cm (0.240") long and 2.083 cm wide open section, the first sudden change in cross-sectional area made up of both laminates. This allows the flow to distribute laterally.
6. The flow distribution section's second sudden cross-sectional area change, a 2.083 cm wide, 0.046 cm tall and 0.152 cm long from laminate 2.
7. The flow distribution section's redistribution section is a 0.071 cm tall gap, a 0.635 cm (0.250") long and 2.083 cm wide open section, made up of both laminates.
8. The third abrupt cross-sectional area change in the flow distribution section is a 0.025 cm tall gap, 2.083 cm wide and 0.152 cm long, made from laminate 1.
9. This fourth abrupt cross-sectional area change is 0.610 cm length and 2.083 cm wide in total, with four 0.406 cm wide by 0.046 cm tall gaps separated by three 0.152 cm wide by 0.025 cm tall gaps.
10. The flow leaves the flow distribution section and enters four separate channels of 0.406 cm in width, 0.025 cm tall in gap and 0.152 cm in length in laminate 1.
11. The four connecting channels have a width of 0.406 cm, a gap 0.071 tall and 15.661 cm in length and 0.071 cm in height made from both laminates. The connecting channel number one is closest to the
12. The flow leaves the connecting channel and enters the footer gate with four 0.025 cm tall gaps, 0.406 cm wide and 0.152 long connections in laminate 1.
13. The flow reconnects in a section like that described in 9, but with a length of 0.551 cm.
14. The flow sees an abrupt cross-sectional area same as 8.

15. The flow is redistributed in a section 0.617 cm (0.243")
and 2.083 in total width with 1.270 cm width and 0.071 cm
flanked by two 0.406 cm wide and 0.025 cm tall gap.
16. The footer gate connection to the M2M is 0.046 cm tall,
1.270 cm wide and 0.152 cm long.
17. The footer gate is connected to a footer m2M manifold of
total length 3.353 cm in length, 0.071 cm tall and 1.186 cm
(0.467") in width. The footer M2M manifold section has a
length of 0.152 cm upstream of the footer gate, with no
inlet flow. The M2M footer manifold has a downstream
length of 3.353 cm that exits to a constant pressure exit. The
$L_{M2M}$ is 2.083 cm.

In this model, air flowed at 0.000334 kg/s at 305° C. with
flow normal to the inlet plane. The outlet pressure was set at
2.204 MPa (305 psig). The model has 167568 cells and the
results of the model are in Table 1. The channel to channel
quality index factor ($Q_1$) was 2.8% for this system. The actual
pressure drop in the connecting channel is on average 0.031
psid, so this quality index factor is quite good. Lower Q
factors could be obtained by generating a larger pressure drop
in the flow distribution section, for example, by the addition
of obstacles. Of note is the fact that the average channel
momentum at the header M2M manifold—gate interface is
26.6° off of the normal vector, while the flow at the exit of the
flow straightener in the sudden contraction is 6.3°.

TABLE

Results of CFD modeling

| Channel # | mass flow rate [kg/s] |
|---|---|
| 1 | 8.276E−05 |
| 2 | 8.419E−05 |
| 3 | 8.469E−05 |
| 4 | 8.236E−05 |

| | |
|---|---|
| Q [%] | 2.8 |
| dP [psid] | 0.234 |
| dP [kPa] | 1.613 |

We claim:
1. A chemical processing device comprising:
a manifold comprising an opening;
at least two parallel connecting channels, a first connecting channel and a second connecting channel, connected to and coplanar with the manifold; wherein the manifold is a header manifold, and further comprising a footer manifold; wherein the connecting channels are connected at one end to the header manifold and at the other end to the footer manifold; and
further characterized by a flow control structure that comprises:
a flow straightener connected to the manifold opening; and
a flow distribution section connecting the flow straightener and the parallel connecting channels;
wherein the flow straightener has a length to hydraulic diameter ratio ($L_{fs}/D_h$) of at least 1 and a cross sectional area; and
wherein the flow distribution section comprises a cross sectional area that is greater than the cross sectional area of the flow straightener.
2. The chemical processing device of claim 1 wherein the flow straightener has a length to hydraulic diameter ($L_{fs}/D_h$) of at least 5 and a cross sectional area.
3. The chemical processing device of claim 1 possessing a Q factor ($Q_1$) of 10% or less.
4. The chemical device of claim 1 comprising: an exit flow straightener, and exit gate and an exit manifold.
5. The chemical processing device of claim 1 wherein the flow straightener has an exit hydrodynamic dimensionless length of greater than 0.01.
6. The chemical processing device of claim 1 wherein the flow distribution section comprises a flow disruption element selected from the group consisting of: cross-bars, partial barriers, strip fins, pins, and wavy fins.
7. The chemical processing device of claim 1 wherein the header manifold and the footer manifold are arranged in a z-manifold configuration.
8. A chemical processing device comprising:
a manifold comprising an opening;
at least two parallel connecting channels, a first connecting channel and a second connecting channel, connected to the manifold; and
further characterized by a flow control structure that comprises:
a flow control design wherein, in each of the at least two parallel connecting channels, 20% or more of the channel's length is characterized by a constant crosssectional area, and 80% or less of the channel's length is characterized by a cross-sectional area reduced in size (relative to the 20% or more of the channel's length that is characterized by a constant cross-sectional area); and
wherein the first connecting channel has a longer length of constant crosssectional area than does the second connecting channel.
9. The chemical processing device of claim 8 wherein the manifold is a header manifold; and wherein the connecting channels are microchannels.
10. The chemical processing device of claim 9 wherein the length of constant crosssectional area in each of the at least two parallel connecting channels is contiguous and straight.
11. The chemical processing device of claim 10 wherein the length of reduced crosssectional area in each of the at least two parallel connecting channels is contiguous and straight.
12. The chemical processing device of claim 11 wherein the first connecting channel and the second connecting channel have substantially constant widths.
13. The chemical processing device of claim 9 wherein the length of reduced crosssectional area in each of the at least two parallel connecting channels is contiguous and straight.
14. The chemical processing device of claim 9 further comprising a submanifold;
wherein the connecting channels are connected to the submanifold.
15. The chemical processing device of claim 8 possessing a Q factor ($Q_1$) of 10% or less.
16. A chemical reactor, comprising:
at least two parallel connecting channels, a first connecting channel and a second connecting channel, connected to a manifold;
wherein a portion of the first connecting channel and a portion of the second connecting channel contain catalyst;
wherein the catalystcontaining portion of the first connecting channel and the catalystcontaining portion of the second connecting channel have equal and constant cross-sectional areas; and
wherein the first connecting channel has a first length of reduced crosssectional area and the second connecting channel has a second length of reduced crosssectional area; wherein the first length is less than the second length.
17. The chemical reactor of claim 16 wherein the manifold is a header manifold.

18. The chemical reactor of claim 16 wherein the connecting channels are microchannels.

19. The chemical reactor of claim 18 wherein the first connecting channel and the second connecting channel have substantially constant widths.

20. A chemical processing device comprising:
    a manifold comprising an opening;
    at least two parallel connecting channels, a first connecting channel and a second connecting channel, connected to the manifold; and
    further characterized by a flow control structure that comprises:
    a flow straightener connected to the manifold opening; and
    a flow distribution section connecting the flow straightener and the parallel connecting channels;
    wherein the flow distribution section comprises a cross sectional area that is greater than the cross sectional area of the flow straightener; and
    further wherein the device comprises a characteristic Q factor ($Q_1$) of 10% or less.

21. The chemical processing device of claim 20 wherein the flow straightener has a length to hydraulic diameter ($L_{fs}/D_h$) of at least 5 and a cross sectional area; and comprising a characteristic Q factor ($Q_1$) of 0.5 to 5%.

* * * * *